Nov. 22, 1966  P. FUHRIMANN  3,286,813
APPARATUS FOR FEEDING STAMPINGS TO MACHINES
Filed Oct. 19, 1964
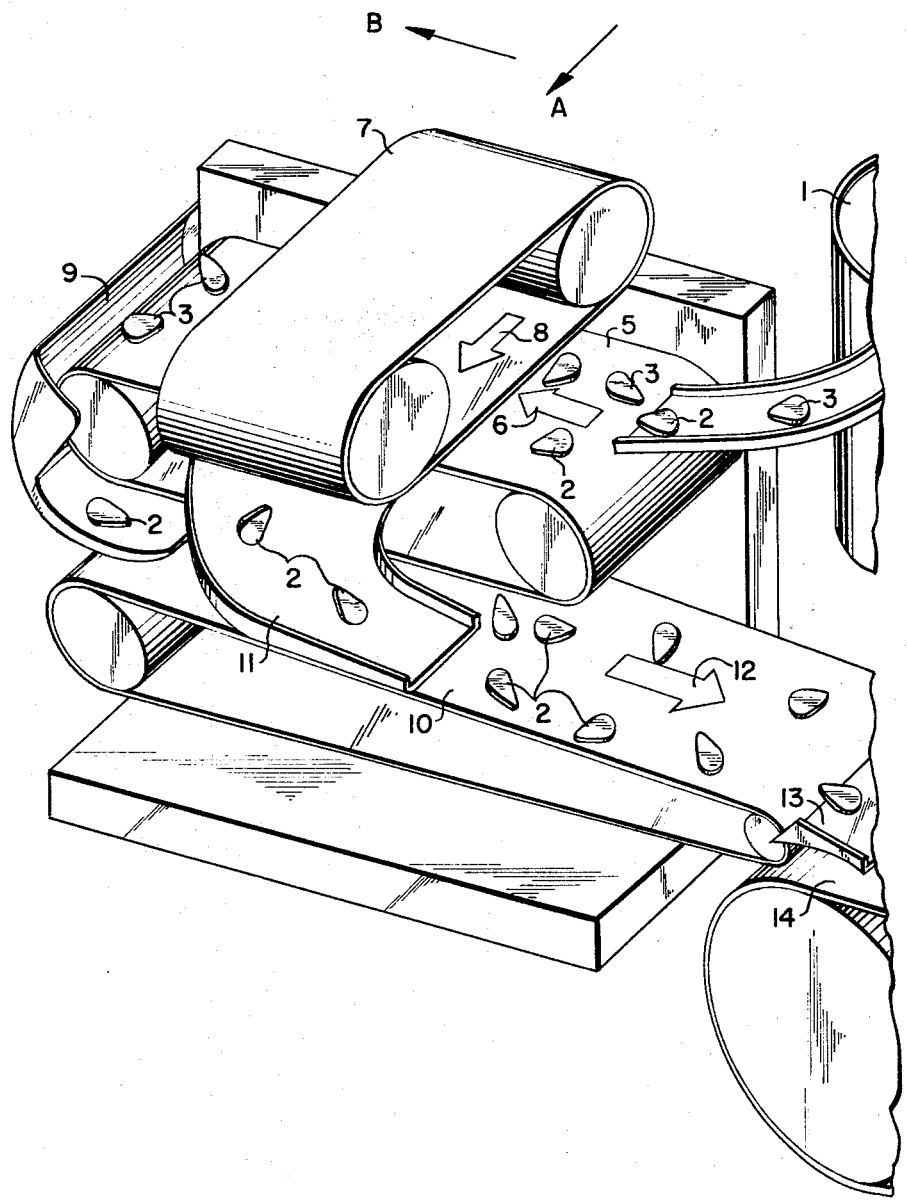
INVENTOR.
PAUL FUHRIMANN
BY Kurt Kelman
AGENT 3,286,813
APPARATUS FOR FEEDING STAMPINGS TO
MACHINES
Paul Fuhrimann, 10 Centralstrasse,
Romanshorn, Switzerland
Filed Oct. 19, 1964, Ser. No. 404,842
Claims priority, application Switzerland, Dec. 10, 1963,
15,142/63
13 Claims. (Cl. 198—33)

This invention relates to apparatus for feeding stampings to machines.

Stampings, even when made on precision stamping presses, naturally have a slight burr, which is advantageously removed on a flexible belt grinder.

The object of this invention is to provide an apparatus for feeding stampings to machines so that the same can be fed rationally and without the use of manual labour. According to the invention the apparatus comprises upper and lower endless conveyor belts having non-slip surfaces, the endless belts being disposed at an angle one to the other with the lower run of the upper belt above the upper run of the lower belt in parallel planes at a clearance less than the thickness of the stampings, the upper run of the lower belt being to receive all stampings intended for a machine but to convey only downwardly burred stampings to a third conveyor belt and the lower run of the upper belt being to convey only upwardly burred stampings to the third conveyor belt, and means for inverting the stampings conveyed by one of the upper and lower conveyor belts before such stamping reach the third conveyor belt, whereby all stampings received by the third conveyor belt are in the same attitudes. It is convenient so to dispose the inverting means that the stampings conveyed by the lower conveyor belt are inverted before such stampings reach the third conveyor belt, whereby all stampings received by the third conveyor belt are upwardly burred.

One exemplified embodiment of the apparatus according to the invention is illustrated in perspective in the accompanying drawing.

Reference numeral 1 denotes an electrically driven vibratory container for precision stampings for feeding to a machine (not shown), for example a flexible belt grinder. The vibratory container 1 has baffles such that the precision stampings 2 and 3 are fed singly via feed means in the form of a chute 4. When the vibratory container 1 is in operation, the precision stampings are fed via the chute 4 with the burr either upwards or downwards, and the stampings of the former category are denoted by reference numeral 2 and those of the latter category by reference numeral 3.

A lower conveyor belt 5 is arranged to receive the precision stampings 2 and 3 leaving the chute 4. The upper run of the conveyor belt 5 travels in the direction of the arrow 6 and carries the precision stampings 2 and 3 in that direction. An upper conveyor belt 7 is disposed above conveyor belt 5 and its lower run travels in the direction of the arrow 8, which is at right-angles to the direction 6. Means (not shown) are provided to adjust the distance between the parallel planes occupied by the upper run of the conveyor belt 5 and the lower run of the conveyor belt 7, such distance being less than the thickness of the precision stampings.

An inverting chute 9, terminating above a third conveyor belt 10, is provided at the delivery end of the conveyor belt 5. A transfer chute 11 is provided laterally of the conveyor belt 5 in association with the conveyor belt 7 and also terminates above the conveyor belt 10, the upper run of the latter travelling in the direction of the arrow 12 and feeding the precision stampings to a chute 13, via which they reach a fourth conveyor belt 14 and are fed by the latter to the grinding machine, for example.

The apparatus ilustrated operates as follows:

The precision stampings 2 and 3, i.e., those with the burr respectively up and down, pass from the container 1 via the chute 4 to the conveyor belt 5 which conveys them to the conveyor belt 7, where the stampings 2 with the burr extending upwards are conveyed to the chute 11 (direction of arrow A) because their burr is pressed tightly against the belt 7, and are fed via chute 11 to the conveyor belt 10 by gravity in unchanged attitudes. The burrs on the stampings 3 on the other hand are pressed tightly against the conveyor belt 5 because of the pressure exerted by the conveyor belt 7 and they are fed by the belt 5 to the chute 9 (direction of arrow B), where they are inverted and whence they are taken by the conveyor belt 10 and conveyed towards the conveyor belt 14 with their burrs upwards.

The conveyor belt 14 takes the stampings, which are now all upwardly burred beneath the rotating flexible belt of the grinding machine, where the burrs are removed.

In the embodiment illustrated for feeding of stampings to a flexible belt grinding machine for de-burring, the two conveyor belts 5 and 7 are disposed at right-angles to one another. The angle between the belts 5 and 7 and therefore the two directions 6 and 8 may be other than 90° however.

The apparatus can also be used for feeding parts to machines other than flexible belt grinding machines and for parts which have a rough surface still requiring machining and a smooth surface which requires no machining, wherever any parts must occupy the same position with the rough surface facing upwards before entering the machine.

In a modification, the roller at the delivery end of the upper run of the conveyor belt 5 may be made of a permanent-magnetic material or a magnetisable material when the apparatus is used for the automatic feeding of stampings of magnetisable material. The magnetic field produced by the roller causes the stampings to be attracted to the conveyor belt as long as they are in the region of the roller. As soon as they leave that region, they drop inverted onto the third conveyor belt 10. Thus in such cases the chute 9 can be dispensed with.

I claim:

1. Apparatus for feeding burred stampings in the same attitudes to machines, comprising: upper and lower endless conveyor belts having non-slip surfaces, said endless belts being disposed at an angle one to the other with the lower run of said upper belt above the upper run of said lower belt in parallel planes at a clearance less than the thickness of the stampings; a third conveyor belt, the upper run of said lower belt being to receive all the stampings intended for a machine but to convey only downwardly burred stampings to said third conveyor belt and the lower run of said upper belt being to convey only upwardly burred stampings to said third conveyor belt; and means for inverting the stampings conveyed by one of said upper and lower conveyor belts before such stampings reach said third conveyor belt, so that all stampings received by said third conveyor belt are in the same attitudes.

2. Apparatus for feeding burred stampings in the same attitudes to machines, comprising: upper and lower endless conveyor belts having non-slip surfaces, said endless belts being disposed at an angle one to the other with the lower run of said upper belt above the upper run of said lower belt in parallel planes at a clearance less than the thickness of the stampings; a third conveyor belt, the upper run of said lower belt being to receive all the stampings intended for a machine but to convey only downwardly burred stampings to said third conveyor belt and the lower run of said upper belt being to convey only upwardly burred stampings to said third conveyor belt; and means for inverting the stampings conveyed by said lower conveyor belt before such stampings reach said third conveyor belt, so that all stampings received by said third conveyor belt are upwardly burred.

3. Apparatus as claimed in claim 2, in which said inverting means is a chute by means of which the stampings are fed by gravity to said third conveyor belt.

4. Apparatus as claimed in claim 3, including means for adjusting the clearance between the lower run of said upper belt and the upper run of said lower belt.

5. Apparatus as claimed in claim 2, in which said inverting means is a magnetic roller over which the upper run of said lower conveyor belt is taken at its delivery end, said roller being disposed above said third conveyor belt.

6. Apparatus as claimed in claim 5, including means for adjusting the clearance between the lower run of said upper belt and the upper run of said lower belt.

7. Apparatus as claimed in claim 2, including means for transferring the stampings conveyed by said upper conveyor belt to said third conveyor belt in unchanged attitudes.

8. Apparatus for feeding burred stampings in the same attitudes to machines, comprising: upper and lower endless conveyor belts having non-slip surfaces, said endless belts being disposed at an angle one to the other with the lower run of said upper belt above thte upper run of said lower belt in parallel planes at a clearance less than the thickness of the stampings; a third conveyor belt, the upper run of said lower belt being to receive all the stampings intended for a machine but to convey only downwardly burred stampings to said third conveyor belt and the lower run of said upper belt being to convey only upwardly burred stampings to said third conveyor belt; a first chute by means of which the stampings conveyed by said lower conveyor belt are inverted and fed by gravity to said third conveyor belt; and a second chute by means of which the stampings conveyed by said upper conveyor belt are fed by gravity to said third conveyor belt in unchanged attitudes, so that all stampings received by said third conveyor belt are upwardly burred.

9. Apparatus as claimed in claim 8, including means for adjusting the clearance between the lower run of said upper belt and the upper run of said lower belt.

10. Apparatus for feeding burred stampings in the same attitudes to machines, comprising: upper and lower endless conveyor belts having non-slip surfaces, said endless belts being disposed at an angle one to the other with the lower run of said upper belt above the upper run of said lower belt in parallel planes at a clearance less than the thickness of the stampings; a third conveyor belt, the upper run of said lower belt being to receive all the stampings intended for a machine but to convey only downwardly burred stampings to said third conveyor belt and the lower run of said upper belt being to convey only upwardly burred stampings to said third conveyor belt; a magnetic roller over which the upper run of the lower conveyor belt is taken at its delivery end, said roller being disposed above said third conveyor belt to deposit the stampings conveyed by said lower conveyor belt in inverted attitudes on said third conveyor belt; and a chute by means of which the stampings conveyed by said upper conveyor belt are fed by gravity to said third conveyor belt in unchanged attitudes, so that all stampings received by said third conveyor belt are upwardly burred.

11. Apparatus as claimed in claim 10, including means for adjusting the clearance between the lower run of said upper belt and the upper run of said lower belt.

12. Apparatus for feeding burred stampings in the same attitudes to machines, comprising: upper and lower endless conveyor belts having non-slip surfaces, said endless belts being disposed at an angle one to the other with the lower run of said upper belt above the upper run of said lower belt in parallel planes at a clearance less than the thickness of the stampings; a third conveyor belt, the upper run of said lower belt being to receive all the stampings intended for a machine but to convey only downwardly burred stampings to said third conveyor belt and the lower run of said upper belt being to convey only upwardly burred stampings to said third conveyor belt; a first chute by means of which the stampings conveyed by said lower conveyor belt are inverted and fed by gravity to said third conveyor belt; a second chute by means of which the stampings conveyed by said upper conveyor belt in unchanged attitudes, so that all stampings received by said third conveyor belt are upwardly burred; means for adjusting the clearance between the lower run of said upper belt and the upper run of said lower belt; feed means; and a container for burred stampings and for feeding the stampings singly via said feed means to the upper run of said lower conveyor belt.

13. Apparatus for feeding burred stampings in the same attitudes to machines, comprising: upper and lower endless conveyor belts having non-slip surfaces, said endless belts being disposed at an angle one to the other with the lower run of said upper belt above the upper run of said lower belt in parallel planes at a clearance less than the thickness of the stampings; a third conveyor belt, the upper run of said lower belt being to receive all the stampings intended for a machine but to convey only downwardly burred stampings to said third conveyor belt and the lower run of said upper belt being to convey only upwardly burred stampings to said third conveyor belt; a magnetic roller over which the upper run of the lower conveyor belt is taken at its delivery end, said roller being disposed above said third conveyor belt to deposit the stampings conveyed by said lower conveyor belt in inverted attitudes on said third conveyor belt; a chute by means of which the stampings conveyed by said upper conveyor belt are fed by gravity to said third conveyor belt in unchanged attitudes, so that all stampings received by said third conveyor belt are upwardly burred; means for adjusting the clearance between the lower run of said upper belt and the upper run of said lower belt; feed means; and a container for burred stampings and for feeding the stampings singly via said feed means to the upper run of said lower conveyor belt.

References Cited by the Examiner

UNITED STATES PATENTS

| | | | |
|---|---|---|---|
| 1,773,646 | 8/1930 | Skov | 221—160 X |
| 2,277,940 | 4/1942 | Wool | 198—33.4 |
| 3,221,857 | 12/1965 | Keller | 221—158 X |

FOREIGN PATENTS 343,864  2/1960  Switzerland.

EVON C. BLUNK, *Primary Examiner.*

R. J. HICKEY, *Assistant Examiner.*